E. M. WARRENFELTZ.
ROTARY MANURE LOADER.
APPLICATION FILED NOV. 10, 1909.
969,227.
Patented Sept. 6, 1910.
2 SHEETS—SHEET 1.
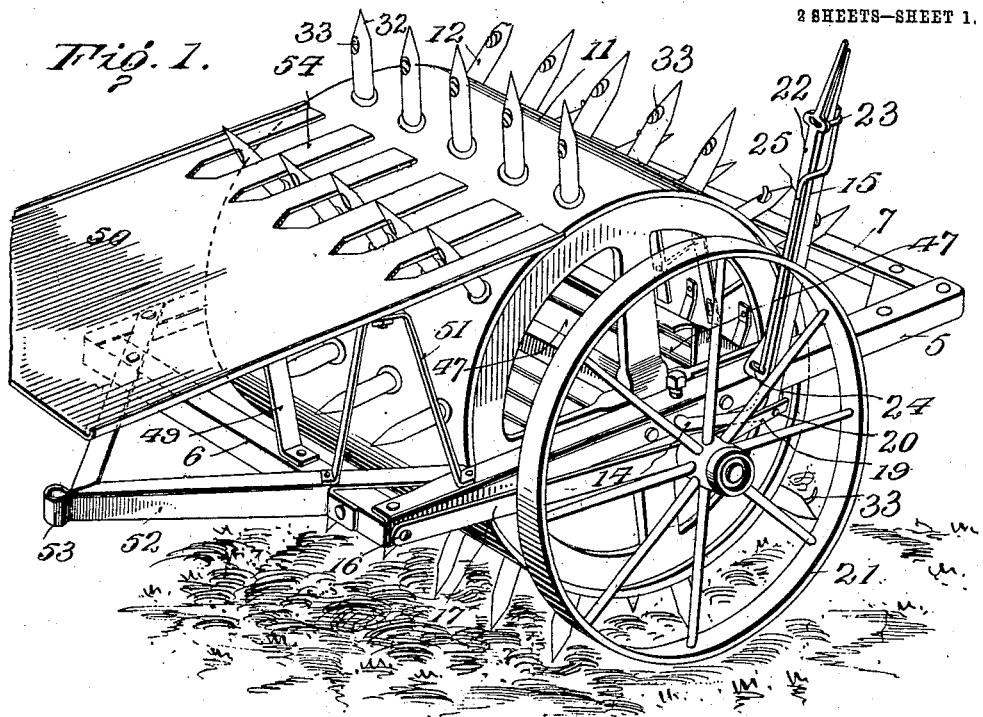
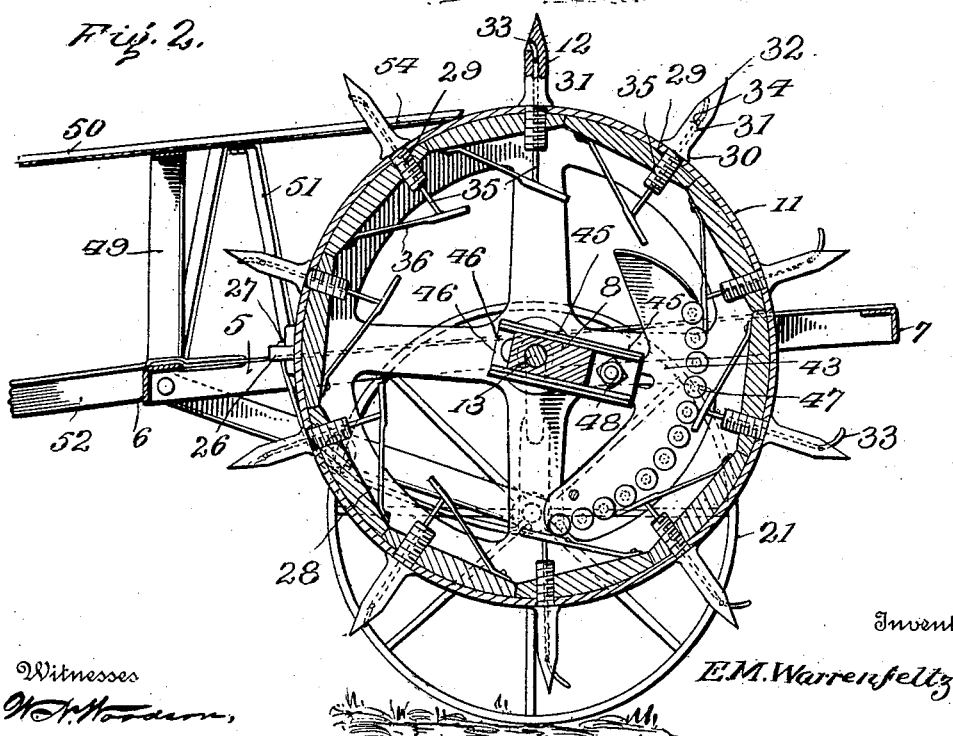
Witnesses
Inventor
E. M. Warrenfeltz
By
Attorneys

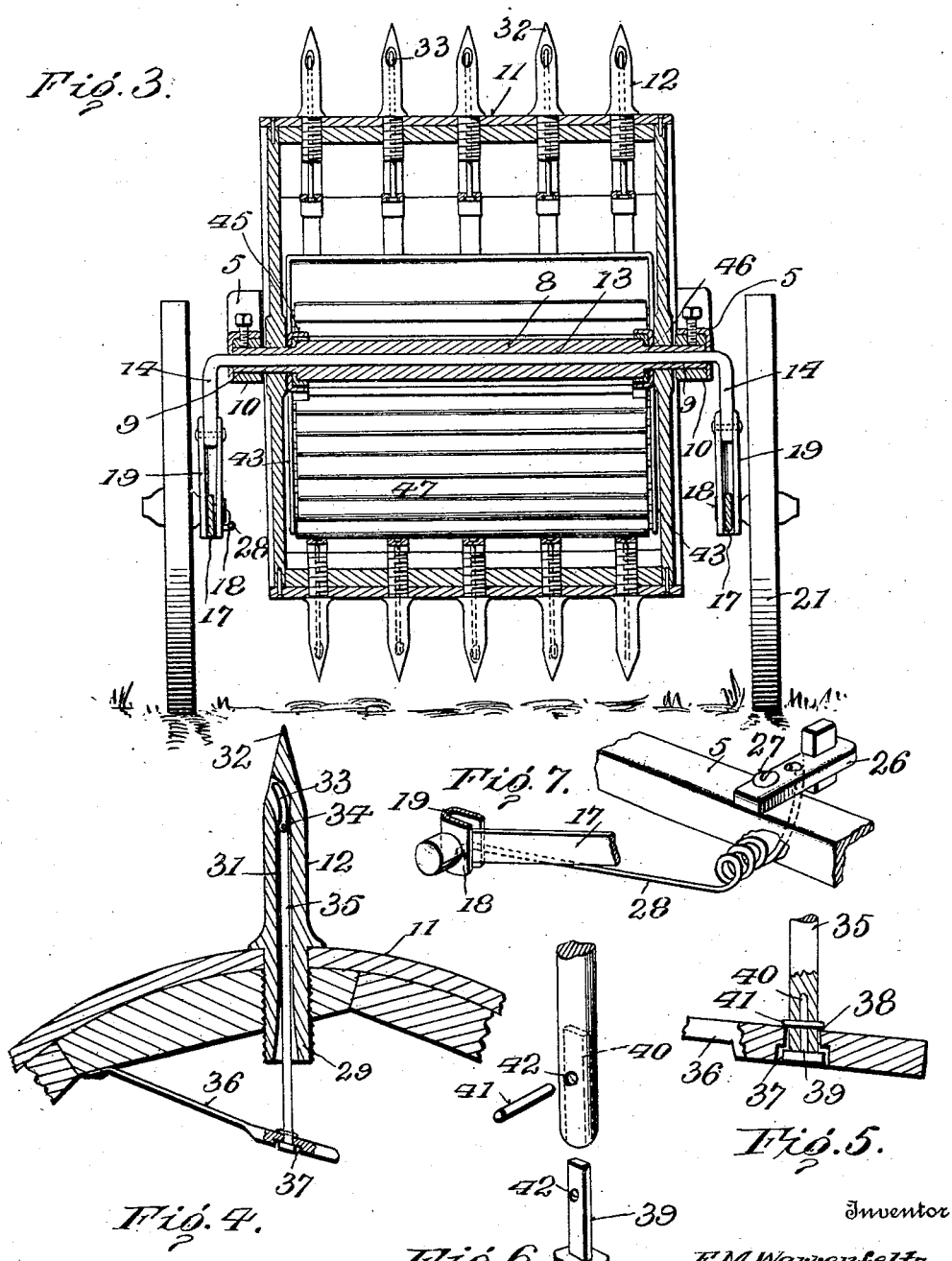

UNITED STATES PATENT OFFICE.

EDWARD M. WARRENFELTZ, OF FUNKSTOWN, MARYLAND.

ROTARY MANURE-LOADER.

969,227.  Specification of Letters Patent.  Patented Sept. 6, 1910.

Application filed November 10, 1909. Serial No. 527,274.

*To all whom it may concern:*

Be it known that I, EDWARD M. WARRENFELTZ, citizen of the United States, residing at Funkstown, in the county of Washington and State of Maryland, have invented certain new and useful Improvements in Rotary Manure-Loaders, of which the following is a specification.

This invention relates to loading devices and more particularly to a machine especially designed for gathering and loading manure on a spreader.

The object of the invention is to provide a manure loader including a truck having a drum or cylinder mounted for rotation thereon and provided with peripheral spurs adapted to gather and elevate the manure as the machine travels over the surface of a field or other inclosure.

A further object is to provide the peripheral spurs of the drum or cylinder with retaining fingers or pins for preventing accidental displacement of the load when the latter is being elevated.

A further object is to provide means for moving the load retaining fingers or pins to extended or operative position when said fingers engage the ground, and means for automatically retracting the fingers to permit the discharge of the load.

A further object is to provide novel means for raising and lowering the supporting frame, and means for locking said frame in lowered position.

A further object is to provide a brake shoe movable into engagement with the drum or cylinder when the supporting frame is in elevated position, thus to prevent rotation of said drum when the machine is not in use, or while being transferred from one portion of a field to another.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a perspective view of a manure spreader constructed in accordance with my invention; Fig. 2 is a vertical sectional view of the same showing the drum or cylinder in elevated or inoperative position; Fig. 3 is a transverse sectional view of Fig. 2; Fig. 4 is a detail vertical sectional view of one of the peripheral spurs showing the manner of mounting the load retaining fingers therein; Fig. 5 is a side elevation partly in section showing the manner of connecting the stems of the retaining fingers in position on the adjacent springs; Fig. 6 is a detail perspective view of the lower portion of the stem and fastening bolt detached, the transverse pin being shown in position to enter the openings in the stem and fastening bolt respectively; Fig. 7 is a detail perspective view showing the construction of the brake shoe and manner of connecting the same with the adjacent link.

Corresponding and like parts are referred to in the following description and indicated in all the views of the drawings by the same reference characters.

The device comprises a substantially rectangular supporting frame preferably formed of angle iron and comprising spaced side bars 5 connected in any suitable manner by end bars 6 and 7.

Extending transversely across the frame is a stationary shaft 8 having its intermediate portion substantially rectangular in cross section, as shown, and its opposite ends provided with reduced trunnions 9 seated in bearings 10 fastened to the side bars 5. Mounted for rotation on the trunnions 9, is a drum or cylinder 11 having its periphery provided with a plurality of sets of spurs 12 adapted to gather the manure and elevate the latter as the machine travels over the surface of a field or other inclosure.

Extending transversely through the shaft 8, is an axle 13 having its opposite ends projecting beyond the trunnions 9 and provided with crank arms 14, one of which terminates in an operating lever 15, as best shown in Fig. 1 of the drawings.

Pivotally connected at 16 to the side bars 5 near the forward end of the frame, are levers 17 to which are pivotally connected at 18, the adjacent ends of links 19, the opposite ends of the links being pivotally connected at 20 to the adjacent crank arms 14. The links 19 are preferably of U-shaped formation, while the pivots 18 are extended laterally to form stub axles on which are journaled the ground wheels 21.

Extending parallel with the operating lever 15, is a locking lever 22 having its upper end connected to the lever 15 by a clip 23, and its lower end enlarged and provided with a transverse slot 24.

A spring 25 extends across the face of the locking lever 22 with one end thereof held in position on the operating lever by the clip 23 and its other end extending through the slot 24 in the locking lever for attachment to the operating lever 15. The tension of the spring 25 is such as to normally and yieldably retain the slotted end of the locking lever in the path of the supporting frame of the truck so as to hold said supporting frame in lowered position and thus permit the active ends of the spurs 12 to engage the ground when the device is in use.

In order to raise the supporting frame and thus elevate the active ends of the spurs 12 above the ground when transferring the machine from place to place, it is merely necessary to press laterally on the upper end of the locking lever 22 which disengages the slotted ends of said locking lever from the adjacent side bar of the supporting frame, when a downward movement exerted on the operating lever 15 will cause the crank arms 14 and links 19 to be moved to a position in vertical alinement to each other, and in which position the supporting frame carrying the cylinder will be elevated, as best shown in Fig. 2 of the drawings.

In order to prevent rotation of the drum or cylinder 11 when transferring the machine from place to place, there is provided a brake shoe 26 pivotally mounted at 27 on one of the side bars 5 of the frame and connected through the medium of a spring 28 with the link 19 on one side of the machine. By arranging the spring in this manner, when the supporting frame is elevated, the link 19 will exert a longitudinal pull on the spring 28 and thus cause the active face of the shoe to bear against the outer face of the cylinder. Conversely, when the supporting frame is lowered, the link moves the spring in the opposite direction and thus disengages the brake shoe from the cylinder.

The spurs 12 are provided with reduced portions 29 which may be threaded in or otherwise secured to the cylinder 11 so as to form annular shoulders 30 which limit the inward movement of the spurs. Each spur 12 is provided with a longitudinal bore 31 opening through one side of the spur near the pointed terminal 32 thereof and in which is slidably mounted load retaining fingers or pins 33.

Pivotally connected at 34 to each load retaining finger, is a stem 35, which latter projects within the cylinder or drum 11 for connection with a spring 36. The springs 36 are bolted or otherwise rigidly secured to the interior wall of the cylinder 11 and are provided at their free ends with recesses or countersunk portions 37 intersected by transverse openings 38 which receive the adjacent ends of the stems 35, the diameter of the openings 38 being preferably larger than the cross sectional diameter of the stems in order to allow a slight lateral movement of one with respect to the other and thus assist in preventing binding or wedging action between the parts.

The stems 35 are retained in position on the springs 36, by means of bolts or similar fastening devices 39, the shank of each of which is preferably square for engagement with a correspondingly squared recess 40 formed in the stems 35, the parts being retained in assembled position by a pin 41 projecting through registering openings 42 formed in the fastening devices 39 and stems 35, respectively.

As a means for automatically moving the load retaining fingers 33 to extended or operative position at predetermined intervals, there is provided an actuating member including spaced brackets 43 having slotted arms 44 and provided with longitudinal flanges 45 which slidably engage suitable guide plates 46 secured to the opposite ends of the angular portion of the shaft 8. The brackets 43 are provided with a series of openings in which are journaled the reduced terminals of rollers or cylinders 47, which latter bear against the springs 36 as the cylinder 11 is rotated and thus serve to move the fingers 33 to extended position to prevent accidental displacement of the load during the elevation of the latter. Bolts or similar fastening devices 48 pass through the slots in the brackets 43 and engage the plates 46 for the purpose of securing the actuating member in different positions of adjustment. Thus it will be seen that by releasing the fastening devices 48, the actuating member may be adjusted laterally with respect to the inner wall of the cylinder 11 so as to regulate the movement of the pins 33.

Secured to the end bar 6 of the supporting frame, is a bracket 49 which serves to support a chute 50, the latter being designed to deliver the manure elevated by the spurs 12 to a spreading machine of any suitable construction. Auxiliary supports or brackets 51 are preferably disposed on opposite sides of the central bracket 49 to assist in preventing accidental displacement of the chute or plate 50. The converging bars 52 are secured to the end bar 6 of the truck frame and are provided at their converging ends with an eye 53 by means of which the device may be attached to the spreader.

The inner end of the plate or chute 50 is formed with a series of longitudinally disposed fingers 54, which latter straddle the spurs 12 when the cylinder is rotated and thus serve to remove the manure adhering to the spurs 12 and deposit the same on the chute 50 for delivery to the spreader. Thus it will be seen that as the machine is caused to travel over the surface of the ground, the spurs 12 will successively engage the ground and gather up the manure for delivery to the chute, the position of the actuating member being such that as the spurs 12 engage the ground, said actuating member will move the retaining fingers 33 to extended position thus to hold the load on the spurs 12 during the elevation of the same. When each set of spurs reaches point above the top of the actuating member, the springs 36 being released, said springs will automatically retract the retaining fingers 33 so that the load may be deposited on the chute 50, as will be readily understood.

The drum 11 may be of any desired shape or cross sectional formation and the length of the spurs 12 may be varied according to the conditions under which the machine is used.

It will also be understood that the supporting frame of the truck may be made of cast iron, angle iron, wood or other suitable material without departing from the spirit of the invention.

Having thus described the invention, what is claimed as new is:

1. In a machine of the class described including a truck, a drum mounted for rotation on the truck and provided with peripheral spurs, and load retaining fingers operating within the spurs.

2. In a machine of the class described including a truck, a drum mounted for rotation on the truck and provided with peripheral spurs, and load retaining devices operating within the spurs and movable to operative position at predetermined intervals.

3. In a machine of the class described including a truck, a drum mounted for rotation on the truck and provided with peripheral spurs, load engaging devices housed within the spurs and movable to operative position on one side of the spurs at predetermined intervals, and means for raising and lowering the drum.

4. In a machine of the class described including a truck, a drum mounted for rotation on the truck and provided with peripheral gathering members, and load retaining fingers yieldably supported within the gathering members and movable to operative position at predetermined intervals.

5. In a machine of the class described including a truck, a drum mounted for rotation on the truck and provided with peripheral gathering members, load retaining fingers slidably mounted within the gathering members, and a stationary actuating member adapted to move the load retaining fingers to extended position at predetermined intervals.

6. In a machine of the class described including a truck, a drum mounted for rotation on the truck and provided with peripheral gathering spurs, load retaining fingers slidably mounted in the spurs, springs disposed within the drum and operatively connected with the fingers, and an actuating member adapted to engage the springs at predetermined intervals for moving the retaining fingers to operative position.

7. In a machine of the class described including a truck, a drum mounted for rotation on the truck and provided with a plurality of peripheral gathering spurs, a chute mounted on the truck and provided with fingers adapted to successively embrace the spurs, and load retaining devices slidably mounted in the spurs and movable to extended position at predetermined intervals.

8. In a machine of the class described including a truck, a drum mounted for rotation on the truck and provided with a plurality of peripheral gathering spurs, load retaining fingers housed within the spurs, stems pivotally connected with the fingers, springs disposed within the drum and connected with the stems, and a stationary actuating member adapted to engage the springs and move the load retaining fingers to operative position as the drum rotates.

9. In a machine of the class described including a truck, a drum mounted for rotation on the truck and provided with a plurality of peripheral gathering spurs, load retaining fingers slidably mounted in the spurs, stems pivotally connected with the load retaining fingers, springs secured to the interior wall of the drum and bearing against the stems, a chute disposed in the path of movement of the spurs and provided with recesses adapted to receive said spurs, and a stationary actuating member adapted to bear against the springs for moving the load retaining fingers to operative position at predetermined intervals.

10. In a machine of the class described including a truck, a drum mounted for rotation on the truck, peripheral gathering spurs secured to the drum and each provided with a longitudinal bore opening through one side of the spur, load retaining devices slidably mounted in the bores of the spurs, a chute, and a stationary actuating member adapted to engage and move the load retaining devices to operative position at predetermined intervals.

11. In a machine of the class described including a truck, a drum mounted for rotation on the truck and provided with a plurality of peripheral gathering spurs, each having a longitudinal bore opening through one side of the spur, load retaining fingers normally housed within the spurs, stems pivotally connected with the fingers, springs connected with the stems for normally retaining the fingers within the bores of the spurs, and a laterally adjustable actuating member having rollers journaled thereon and adapted to engage the springs for moving the fingers to extended position at predetermined intervals.

12. In a machine of the class described including a truck having a stationary transverse shaft provided with trunnions, a drum mounted for rotation on the trunnions and provided with peripheral gathering spurs, load retaining fingers carried by and normally housed within the gathering spurs, stems pivotally connected with the fingers, springs secured to the interior of the drum and bearing against the stems, guide plates secured to the stationary shaft, an actuating member having spaced slotted arms slidably mounted on the guide plates, bolts extending through the slots in the arms and engaging the guide plates for securing the actuating member in adjusted position, and rollers journaled between the arms of the actuating member and adapted to bear against the springs for exposing the load retaining fingers at predetermined intervals.

13. In a machine of the class described, a supporting frame, a stationary transverse shaft extending across the frame and provided with trunnions, a drum journaled on said trunnions and provided with peripheral gathering devices, load retaining fingers carried by the gathering devices, an axle extending transversely through the shaft and provided with oppositely disposed crank arms, links pivotally connected with the crank arms, levers forming a pivotal connection between the links and supporting frame, spindles disposed at the juncture of the links and levers, ground wheels journaled on the spindles, an operating lever connected with one of the crank arms for raising and lowering the supporting frame, and means for locking the supporting frame in lowered position.

14. In a machine of the class described, including a supporting frame, a transverse shaft carried by the frame, a drum mounted for rotation on the shaft and provided with a plurality of gathering devices, an axle extending through the shaft and provided with oppositely disposed crank arms, links pivotally connected with the crank arms, levers forming a connection between the frame and links, spindles extending laterally from the links at their points of attachment to the levers, ground wheels mounted on the spindles, an operating lever connected with one of the crank arms, a spring actuated locking lever pivotally mounted on the operating lever and having its lower end slotted and adapted to engage the frame for supporting said frame in lowered position, and a spring extending through the slot in the locking lever and having its intermediate portion bearing against one side of the locking lever and its other end anchored on the operating lever.

15. In a machine of the class described including a supporting frame, a stationary transverse shaft carried by the frame and provided with oppositely disposed trunnions, a drum mounted for rotation on the trunnions and provided with peripheral gathering devices, load retaining members co-acting with the spurs, an axle extending through the shaft and provided with oppositely disposed crank arms, links pivotally connected with the crank arms, levers forming a connection between the links and frame, spindles extending laterally from the links at their points of attachment to the levers, ground wheels mounted on the spindles, a brake shoe pivotally mounted on the frame and movable into engagement with the drum, a spring forming a connection between the brake shoe and the link on one side of the frame, an operating lever secured to the crank shaft on the other side of the frame, and a spring actuated locking lever carried by the operating lever and adapted to engage the supporting frame for holding said supporting frame in lowered position.

16. A machine of the class described including a truck, a drum mounted for rotation on the truck and provided with peripheral gathering members, and load retaining devices supported within the gathering members and movable to operative position at predetermined intervals.

In testimony whereof I affix my signature in presence of two witnesses.

EDWARD M. WARRENFELTZ. [L. S.]

Witnesses:
   Jos. A. Mullendore,
   J. W. Schnebly.